US010281017B2

(12) United States Patent
Lindemann

(10) Patent No.: US 10,281,017 B2
(45) Date of Patent: May 7, 2019

(54) TORQUE CONVERTER INCLUDING SPHERICAL CLUTCH

(71) Applicants: Schaeffler Technologies AG & Co. KG, Herzogenaurach (DE); Schaeffler Group USA, Inc., Fort Mill, SC (US)

(72) Inventor: Patrick Lindemann, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 250 days.

(21) Appl. No.: 14/722,471

(22) Filed: May 27, 2015

(65) Prior Publication Data
US 2015/0345605 A1    Dec. 3, 2015

Related U.S. Application Data

(60) Provisional application No. 62/005,289, filed on May 30, 2014.

(51) Int. Cl.
*F16H 45/02* (2006.01)
*F16D 13/64* (2006.01)
(Continued)

(52) U.S. Cl.
CPC .......... *F16H 45/02* (2013.01); *F16D 13/64* (2013.01); *F16D 13/66* (2013.01); *F16D 25/0632* (2013.01); *F16H 2045/0205* (2013.01); *F16H 2045/0278* (2013.01); *F16H 2045/0289* (2013.01)

(58) Field of Classification Search
CPC ..... F16H 2045/0226; F16H 2045/0221; F16D 13/66; F16D 13/64
See application file for complete search history.

(56) References Cited

U.S. PATENT DOCUMENTS 1,141,322 A * 6/1915 Dodge .............. F16D 13/64
188/234
1,168,246 A * 1/1916 Brush .............. F16D 13/64
192/107 R
(Continued)

FOREIGN PATENT DOCUMENTS

CN       203161883 U    8/2013
EP         2077399 A1   7/2009
(Continued)

OTHER PUBLICATIONS

International Search Report for PCT/US2015/032574, Completed by the Korean Patent Office dated Aug. 27, 2015, 3 Pages.

*Primary Examiner* — Jacob S. Scott
*Assistant Examiner* — Tinh Dang
(74) *Attorney, Agent, or Firm* — Lekeisha M. Suggs

(57) ABSTRACT

A clutch assembly comprising: an axis of rotation; first and second spherical centers positioned along the axis of rotation; a first member having a first spherical surface including: a radius defining a first curvature; the first spherical center; and a first frictional surface; a second member having a second spherical surface including: said radius defining a second curvature about same or equal to the first curvature; the second spherical center; and a second frictional surface. A torque converter comprising a spherical clutch assembly is also disclosed.

13 Claims, 6 Drawing Sheets

(51) Int. Cl.
*F16D 13/66* (2006.01)
*F16D 25/0632* (2006.01)

(56) References Cited

U.S. PATENT DOCUMENTS

| | | | | |
|---|---|---|---|---|
| 1,987,194 A * | 1/1935 | Kingston | ................ | F16D 13/66 |
| | | | | 192/107 R |
| 2,090,411 A * | 8/1937 | Eason | ..................... | F16D 13/66 |
| | | | | 192/107 R |
| 2,126,760 A * | 8/1938 | Eason | ..................... | F16D 13/26 |
| | | | | 192/112 |
| 7,445,099 B2 * | 11/2008 | Maucher | ................ | F16D 47/06 |
| | | | | 192/3.26 |
| 9,297,429 B2 * | 3/2016 | Lindemann | ............. | F16D 33/18 |
| 9,303,700 B2 * | 4/2016 | Lindemann | ............. | F16H 41/24 |
| 9,394,981 B2 * | 7/2016 | Lindemann | ............. | F16H 45/02 |
| 2006/0118378 A1 | 6/2006 | Fujii et al. | | |
| 2009/0157272 A1 * | 6/2009 | Uhler | ...................... | F16H 45/02 |
| | | | | 701/67 |
| 2012/0152680 A1 | 6/2012 | Vanni et al. | | |
| 2013/0230385 A1 * | 9/2013 | Lindemann | ............. | F16D 33/18 |
| | | | | 415/122.1 |
| 2015/0021135 A1 * | 1/2015 | Jameson | .................. | F16D 33/18 |
| | | | | 192/3.28 |
| 2015/0021137 A1 | 1/2015 | Lindemann et al. | | |
| 2015/0027110 A1 * | 1/2015 | Lindemann | ............. | F16H 41/24 |
| | | | | 60/338 |
| 2015/0027111 A1 * | 1/2015 | Steinberger | ............ | F16D 33/18 |
| | | | | 60/338 |
| 2016/0160971 A1 * | 6/2016 | Depraete | ................ | F16H 45/02 |
| | | | | 192/3.29 |

FOREIGN PATENT DOCUMENTS

| | | |
|---|---|---|
| JP | H03157520 A | 7/1991 |
| KR | 20060056117 A | 5/2006 |

* cited by examiner

TORQUE CONVERTER INCLUDING SPHERICAL CLUTCH

FIELD

The invention relates generally to a torque converter including a spherical clutch arrangement.

BACKGROUND

United States Patent Publication No. 2015/0021137, hereby incorporated by reference herein, describes a two pass multi-function torque converter with a resilient element for opening an impeller clutch.

United States Patent Publication No. 2012/0152680, hereby incorporated by reference herein, teaches an embodiment wherein a first friction surface includes an axial bulge in the portion of the friction surface between a first inner diameter and a first outer diameter, wherein the axial bulge is defined by an arc having a radius at least one order of magnitude larger than a radial distance between the inner diameter and the outer diameter.

BRIEF SUMMARY

Example aspects broadly comprise a clutch assembly comprising: an axis of rotation; first and second spherical centers positioned along the axis of rotation; a first member having a first spherical surface including: a radius defining a first curvature; the first spherical center; and a first frictional surface; a second member having a second spherical surface including: said radius defining a second curvature about same or equal to the first curvature; the second spherical center; and a second frictional surface. In an example aspect, the second spherical center is about same or equal to the first spherical center when the clutch is engaged. In an example aspect, the second spherical center is offset from the first spherical center when the clutch is not engaged. In an example aspect, the first spherical surface further comprises a great circle including the radius and the first spherical center, wherein the first and second frictional surfaces are arranged for frictional engagement along the great circle. In an example aspect, the first or second member comprises friction material and wherein the first or second frictional surface is disposed on the friction material. In an example aspect, the friction material includes a bonding surface and an opposite surface. In an example aspect, the opposite surface is convex.

Other example aspects broadly comprise a torque converter comprising: an axis of rotation; first and second spherical centers positioned along the axis of rotation; an impeller including an impeller shell having a first inner spherical surface including: a radius defining a first curvature; the first spherical center; and a first frictional surface; a turbine including a turbine shell having a second inner spherical surface including: said radius defining a second curvature about same or equal to the first curvature; the second spherical center; and a second frictional surface; wherein the first and second frictional surfaces are arranged for frictional engagement. In an example aspect, the impeller shell or turbine shell comprises friction material and wherein the first or second frictional surface is disposed on the friction material. In an example aspect, the friction material includes a bonding surface and an opposite surface. In an example aspect, the opposite surface is convex. In an example aspect, the impeller shell comprises a first spherical portion including the first inner spherical surface, a rear cover outer surface, and a first thickness. In an example aspect, the impeller shell further comprises first and second tapered portions and a second thickness greater than the first thickness. In an example aspect, the impeller shell further comprises a cylindrical portion including an end portion and extending to and arranged for connection with a cover and a bent portion extending and integrally attached to an impeller shell torus portion. In an example aspect, the turbine shell comprises a second spherical portion including the second inner spherical surface and an outer turbine shell surface. In an example aspect, the turbine shell further comprises a radial wall portion extending and integrally attached to a turbine shell torus portion. In an example aspect, the first spherical surface further comprises a great circle including the radius and the first spherical center, wherein the first and second frictional surfaces are arranged for frictional engagement along the great circle.

Other example aspects broadly comprise a torque converter comprising: an axis of rotation; first and second spherical centers positioned along the axis of rotation; a cover; an impeller including an impeller shell having: a first spherical portion including a first inner spherical surface including: a radius defining a first curvature; the first spherical center; and a first frictional surface; a bent portion; and a cylindrical portion including an end portion extending to and arranged for connection with the cover; a turbine including a turbine shell having: a second spherical portion including a second inner spherical surface including: said radius defining a second curvature about same or equal to the first curvature; the second spherical center; and a second frictional surface; wherein the first and second frictional surfaces are arranged for frictional engagement; wherein the second spherical center is about same or equal to the first spherical center when clutch is engaged; and, wherein the second spherical center is offset from the first spherical center when clutch is not engaged. In an example aspect, the first spherical surface further comprises a great circle including the radius and the first spherical center, wherein the first and second frictional surfaces are arranged for frictional engagement along the great circle. In an example aspect, the first or second spherical portion comprises friction material and wherein the first or second frictional surface is disposed on the friction material.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

A spherical clutch arrangement as disclosed herein provides advantages such as misalignment compensation while at the same time reducing torus size. A spherical clutch assembly is suitable for use in, for example, torque converters. Misalignment of components during operation can lead to undesirable torque fluctuations; the spherical clutch described herein is self-centering. Reducing torus size of torque converters, and thus also reducing total weight of the assembly, is desirable in modern automobiles, for example, to increase fuel economy.

Figure 1:
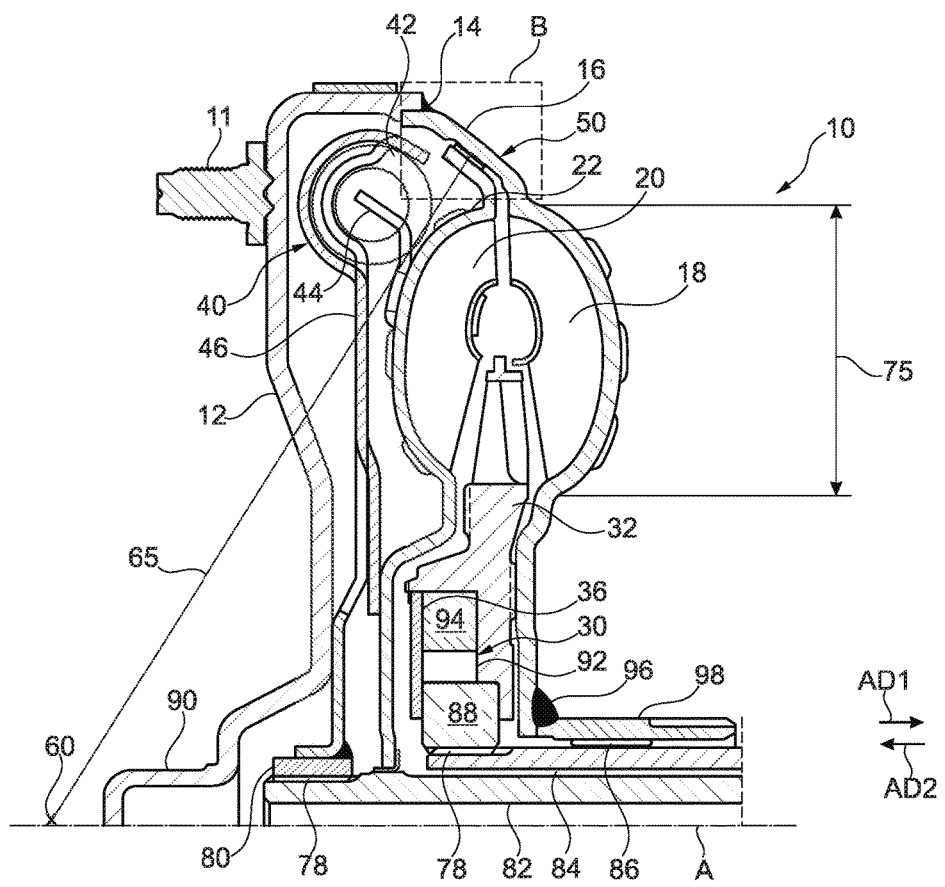
FIG. 1 illustrates a partial cross sectional side view of a torque converter including a spherical clutch assembly according to an example aspect.

The following description is made with reference to FIGS. 1-5. FIG. 1 illustrates a partial cross sectional side view of a torque converter including a spherical clutch assembly according to an example aspect. Torque converter 10 is interchangeably referred to as torque converter assembly herein. Torque converter 10 includes front cover 12 for connecting to a crankshaft of an internal combustion engine via stud 11 and rear cover 16, also referred to as impeller shell interchangeably herein, for an impeller 18. Impellers are also referred to in the art interchangeably as 'pump'. Front cover 12 and rear cover 16 are fastened together via weld 14. Cover 12 includes cover pilot portion 90. Torque converter 10 also includes turbine 20, turbine shell 22, stator 32 between turbine 20 and impeller 18. Turbines and impellers, as is known in the art, include a plurality of blades. Torque converter 10 includes torus portion 75, generally referring to the fluid coupling portion including turbine 20 and impeller 18 between the dashed lines as shown in FIG. 1.

Torque converter 10 includes one-way clutch 30, which supports stator 32, and includes inner race 88, roller 92, and outer race 94. Side plate 36 holds one-way clutch 30 in place within stator 32. Torque converter 10 also includes damper assembly 40, which is connected to and drivable by turbine 20, and is positioned between turbine 20 and front cover 12. Damper assembly 40 includes spring 42, flange 46, and drive tab 44 fixed to turbine shell 22 to damper assembly 40.

Torque converter 10 includes clutch assembly 50 as will be described in greater detail in FIGS. 3-5. Torque converter 10, as shown in FIG. 1, further includes hub 80 fixed to flange 46, bushing 86, weld 96, and hub 98. FIG. 1 also shows transmission components spline 78, input shaft 82, and stator shaft 84. Hub 80 is splined to input shaft 82 and inner race 88 is splined to stator shaft 84 at splines 78. Bushing 86 positions and at least partially seals turbine shell 22 on shaft 82.

Torque converter 10 includes axis of rotation A, also simply referred to as axis A, as well spherical center 60 and radius 65. Components of torque converter 10 include spherical surfaces, wherein geometrically speaking, the outline or surface shape of the particular components simulate or equate to at least a portion of a sphere, wherein the sphere is defined by the center and the radius. Spherical center 60 is positioned on axis of rotation A, where radius 65 intersects with axis A. Radius 65 is the distance from spherical center 60 to a portion of clutch assembly 50. More specifically, radius 65 is the distance from spherical center 60 to the first spherical surface of clutch assembly 50; the first spherical surface is shown in greater detail in FIGS. 3-5. First axial direction AD1 is opposite to second axial direction AD2.

Figure 2:
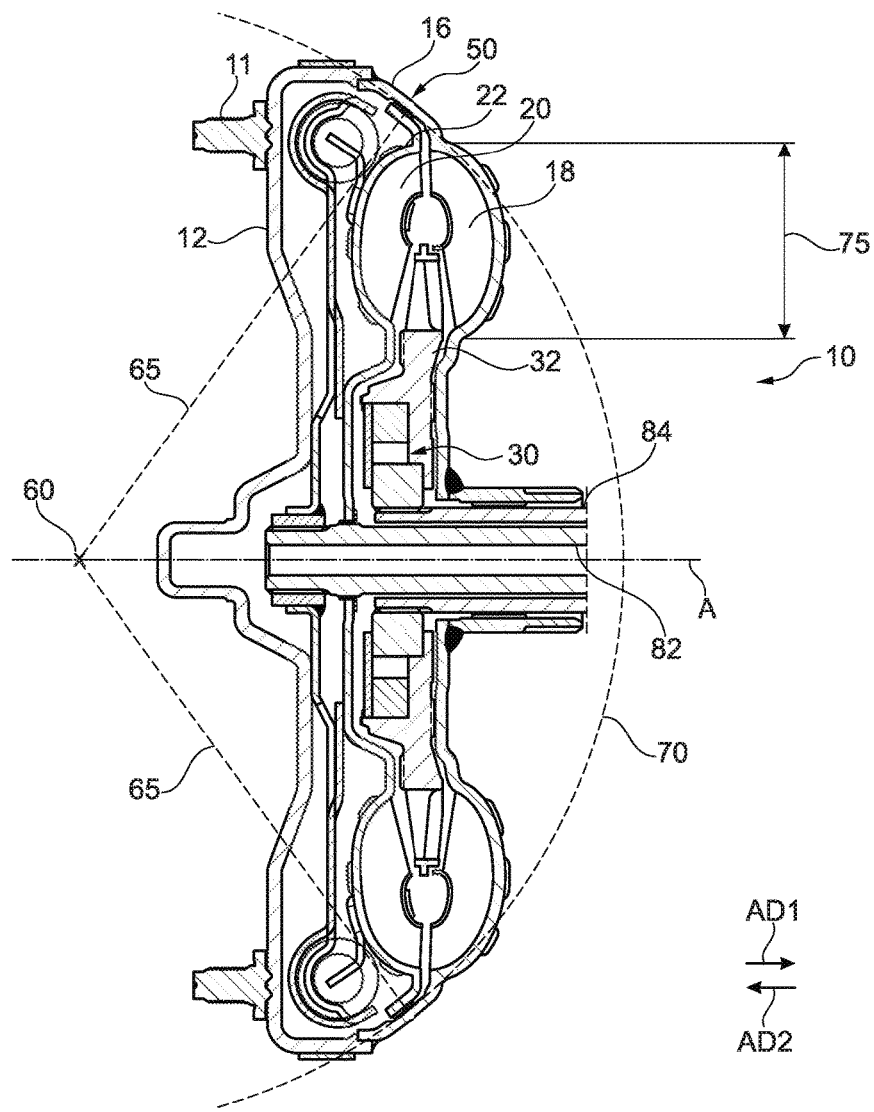
FIG. 2 illustrates a cross sectional side view of the torque converter of FIG. 1, rotated about axis of rotation A, according to an example aspect.

FIG. 2 illustrates a cross sectional side view of the torque converter of FIG. 1, rotated about axis of rotation A, according to an example aspect. FIG. 2 shows torque converter elements as in FIG. 1 and also includes great circle 70. Great circle 70 illustrates a circle of the sphere having spherical center 60 and radius 65. A plane passing through great circle 70 divides the sphere into two equal parts. Clutch assembly 50 is arranged for engagement along great circle 70.

Figure 3:
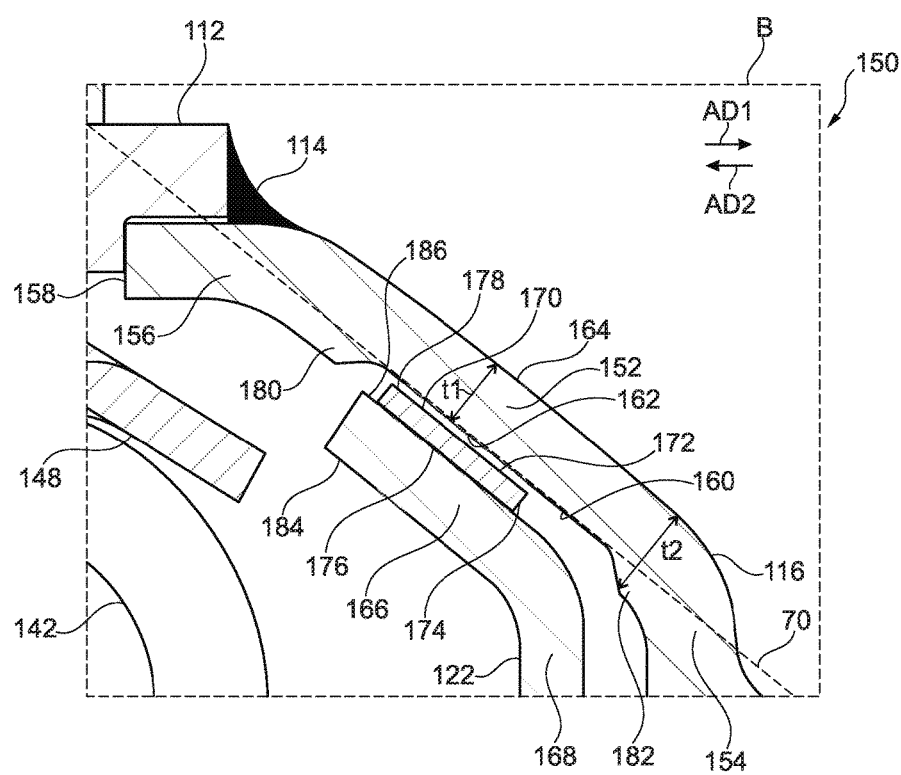
FIG. 3 illustrates a partial side view, as indicated by box B of FIG. 1, of a torque converter including a spherical clutch assembly according to an example aspect.
Figure 4:
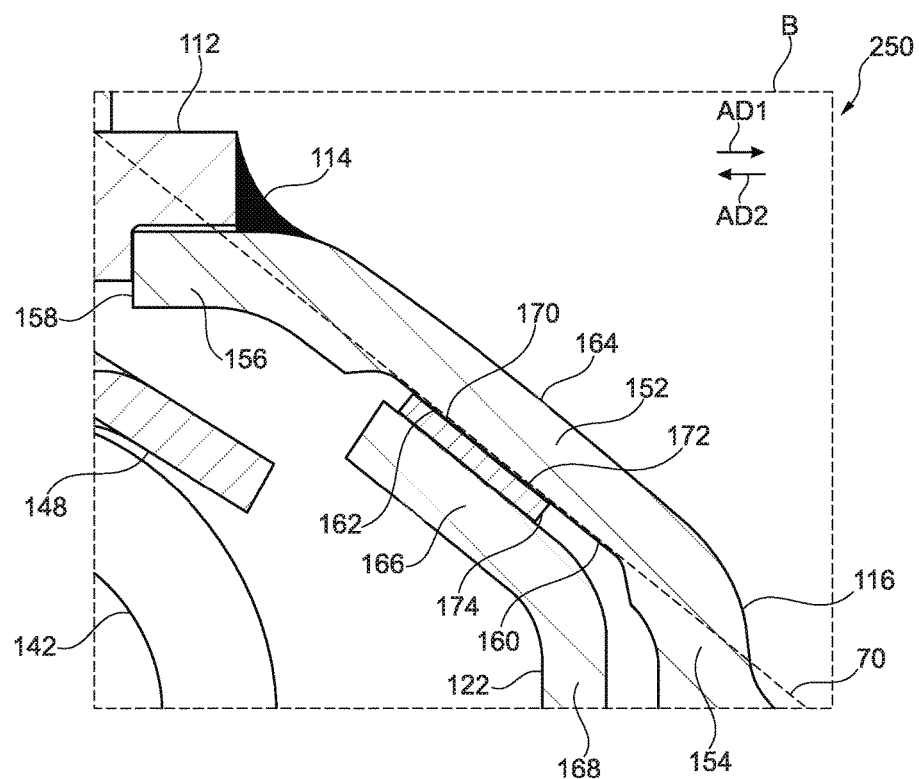
FIG. 4 illustrates a partial side view of a spherical clutch assembly according to an example aspect, wherein the clutch is engaged.
Figure 5:
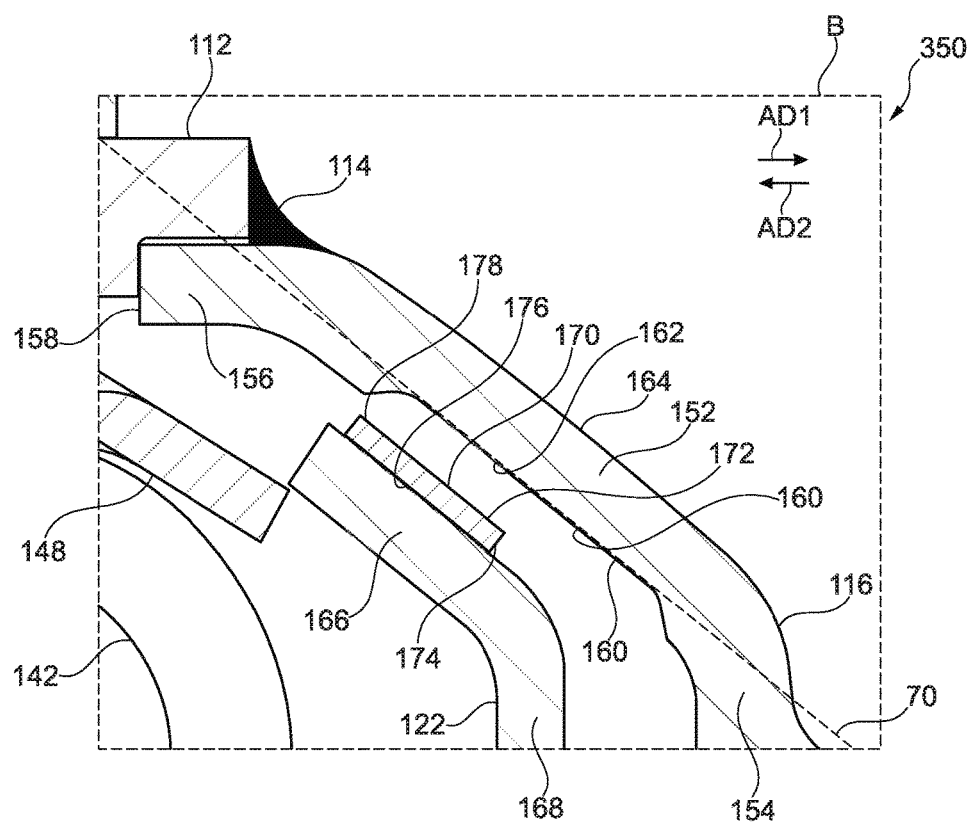
FIG. 5 illustrates a partial side view of a spherical clutch assembly according to an example aspect, wherein the clutch is disengaged.
Figure 6:
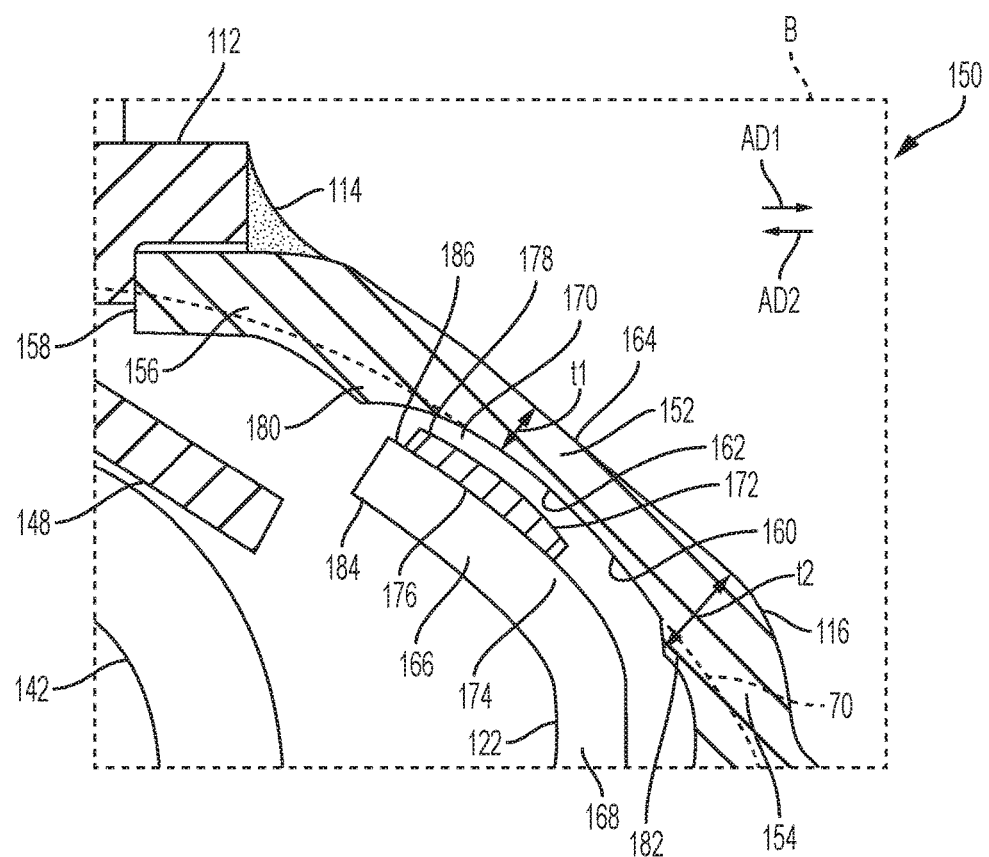
FIG. 6 illustrates a partial side view of a spherical clutch assembly according to an example aspect, where the spherical clutch surface is exaggerated for clarity.

FIGS. 3-6 illustrate a partial side view, as indicated by box B of FIG. 1, of a torque converter including a spherical clutch assembly according to an example aspect. It is noted that spherical center 60 and radius 65 are not viewable in close up FIGS. 3-6, however, the spherical center and radius elements are present as depicted in FIG. 1, wherein FIGS. 3-5 are merely close up views of FIG. 1 for clarity. FIG. 6 shows the clutch with a smaller diameter for added clarity. Spherical clutch assembly is also referred to interchangeably herein as clutch assembly. FIG. 3 shows clutch assembly 150 including a first member or, in an example aspect, rear cover 116. First member or rear cover 116 comprises first spherical portion 152, bent portion 154, and cylindrical portion 156 having end portion 158. End portion 158 connects to cover 112 at weld 114 as is known in the art. Spherical portion 152 includes first spherical surface 160, also referred to interchangeably herein as first inner spherical surface; a portion of first spherical surface 160 includes first frictional surface 162. Spherical portion 152 further comprises rear cover outer surface 164, opposite to first inner spherical surface 160. Clutch assembly 150 also includes a second member or, in an example aspect, an extension of turbine shell 122 including second spherical portion 166 and radial wall portion 168. Spherical portion 166 includes second spherical surface 170, also referred to interchangeably herein as second inner spherical surface; wherein second spherical surface 170 includes second frictional surface 172. FIGS. 3-6 also show portions of flange 148 and spring 142.

Referring to FIGS. 1-5 generally and FIG. 4-5 more particularly, clutch assembly 250, 350 comprises axis of rotation A and first and second spherical centers positioned along the axis of rotation. FIG. 4 illustrates a partial side view of spherical clutch assembly 250 according to an example aspect, wherein the clutch is engaged; while FIG. 5 illustrates a partial side view of a spherical clutch assembly 350 according to an example aspect, wherein the clutch is disengaged. Disengagement distance of clutch assembly 350 is exaggerated for clarity. The second spherical center lies on axis A at or near first spherical center 60 depending upon the state of clutch engagement. In other words, the second spherical center is positioned in the same location as first spherical center 60, in the condition that clutch assembly 250 is engaged. Furthermore, second spherical center is offset from first spherical center, in the condition that clutch assembly 350 is not engaged or disengaged, in second axial direction AD2 relative to first spherical center 60 along axis A. That is to say, when the clutch is disengaged, the second spherical center moves in a direction parallel to axis A axially away from torus portion 75. The second spherical center is not illustrated in the figures as the scale of axial movement is relatively small, and can be thought of in terms of millimeters of movement, so that discernment between spherical centers in FIGS. 1 and 2 would be indistinguishable.

Referring again to FIGS. 1-5, in an example aspect, clutch assembly 150 comprises axis of rotation A and first and second spherical centers, first member 116 having first spherical surface 160 including radius 65 defining a first curvature and first spherical center 60; where first spherical surface 160 includes first frictional surface 162. Clutch assembly 150 also comprises second member 122 having second spherical surface 170 including radius 65 defining a second curvature about same or equal to the first curvature and a second spherical center, which may be coincident with spherical center 60 in clutch engaged mode or offset relative to spherical center 60 along axis A in axial direction AD2, which is away from torus portion 75, in clutch disengaged mode. In other words, the second spherical center is about same or equal to the first spherical center when the clutch is engaged, and the second spherical center is offset from the first spherical center when the clutch is not engaged. Spherical surface 170 includes second frictional surface 172.

First spherical surface 160 further comprises great circle 70 including radius 65 and first spherical center 60, wherein the first and second frictional surfaces 162, 172 are arranged for frictional engagement along great circle 70. In providing clutch engagement along great circle 70, clutch assembly 150 is self-centering and therefore provides consistent torque performance and even contact at the frictional surfaces. Misalignment compensation between transmission input shaft 82 and axis of rotation A is achieved wherein clutch components are aligned within great circle 70.

The second member, in an example aspect turbine shell 122, comprises friction material 174 including bonding surface 176 and opposite surface 178. While the second member is shown and described herein as including friction material 174, as those skilled in the art would recognize, friction material 174 is not limited to the second member and could be incorporated into either first or second members. In other words, a first member including friction material 174 is also contemplated as would, for example, be fixed to an inner surface of an impeller shell. Second frictional surface 172 is disposed on friction material 174. Second frictional surface 172 is disposed, in an example aspect, on opposite surface 178.

As is known in the art of applying friction material to a member using a die, it is possible to tailor the shape of opposite surface 178 by tailoring the thickness of friction material 174 and the shape of the member to which the friction material will be applied. In an example embodiment, member 122 includes turbine shell outer surface 184 and turbine shell inner surface 186. In an example aspect, the shape of inner surface 186 may be spherical or flat prior to applying friction material 174; however, in either case, second inner spherical surface 170 is spherical. This is accomplished as follows. In the example of surface 186 being flat, friction material 174 includes a thickness profile that is convex to ensure spherical surface 170 maintains as spherical. In other words, opposite surface 178 is convex. Yet in another example embodiment where surface 186 is spherical, friction material 174 includes a uniform thickness and thus surface 170 is also spherical as applied to surface 186.

In another example aspect, a torque converter including a spherical clutch assembly is provided herein. Torque converter 10 comprises: axis of rotation A; first and second spherical centers positioned along axis of rotation A; impeller 18 including impeller shell 16, 116 having first inner spherical surface 160 including radius 65 defining a first curvature, first spherical center 60, and first frictional surface 162; turbine 20 including turbine shell 22, 122 having second inner spherical surface 170 including radius 65 defining a second curvature about same or equal to the first curvature, second spherical center (offset in axial direction AD2 for clutch disengaged mode and coincident with first spherical center 60 in clutch engaged mode); and second frictional surface 172; wherein first and second frictional surfaces 162, 172 are arranged for frictional engagement. Second member 22, 122 comprises friction material 174, wherein second frictional surface 172 is disposed on friction material 174. Friction material 174 includes bonding surface 176 and opposite surface 178. Opposite surface 178 is, in an example aspect, convex. In an example aspect, first spherical surface 160 further comprises great circle 70 including radius 65 and first spherical center 60, wherein first and second frictional surfaces 162, 172 are arranged for frictional engagement along great circle 70.

In an example aspect, first member 116 comprises first spherical portion 152 including first inner spherical surface 160, rear cover outer surface 164, and first thickness t1. In an example aspect, first member 116 further comprises first and second tapered portions 180, 182 and second thickness t2, where t2 is at least equal to or greater than t1. First spherical portion 152 need not be tapered, and the configuration or arrangement of the transition regions between spherical portion 152 and neighboring portions cylindrical portion 156 and bent portion 154 may vary. In an example aspect, first member comprises cylindrical portion 156 including end portion 158 and extending to and arranged for connection with cover 112. In an example aspect, first member comprises bent portion 154 extending and integrally attached to torus portion 75 of impeller shell 116, also referred to as impeller shell torus portion.

In an example aspect, second member 122 comprises second spherical portion 166 including second inner spherical surface 170 and turbine shell outer surface 184. In an example aspect, second member 122 further comprises radial wall portion 168 extending and integrally attached to torus portion 75 of turbine shell 122, also referred to as turbine shell torus portion.

In yet another example aspect, torque converter 10 comprises: axis of rotation A; first and second spherical centers positioned along axis of rotation A; cover 12, 112; impeller 18 including impeller shell 16, 116 having: spherical portion 152 including first inner spherical surface 160 including radius 65 defining a first curvature; first spherical center 60; and first frictional surface 162; bent portion 154; and cylindrical portion 156 including end portion 158 extending to and arranged for connection with cover 12, 112; turbine including turbine shell 22, 122 having second inner spherical surface 170 including: radius 65 defining a second curvature about same or equal to the first curvature; second spherical center (offset in axial direction AD2 for clutch disengaged mode and coincident with first spherical center 60 in clutch engaged mode); and second frictional surface 172; wherein first and second frictional surfaces 162, 172 are arranged for frictional engagement. In other words, second spherical center is about same or equal to first spherical center 60 when clutch is engaged (FIG. 4) and, wherein second spherical center is offset from first spherical center 60 when clutch is not engaged (FIG. 5). In an example aspect, first spherical surface 160 further comprises great circle 70 having radius 65 and first spherical center 60, wherein first and second frictional surfaces 162, 172 are arranged for frictional engagement along or aligned with great circle 70. In an example aspect, second member 22, 122 comprises friction material 174, wherein second frictional surface 172 is disposed on friction material 174.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. A torque converter comprising:
   an axis of rotation;
   first and second spherical centers positioned along the axis of rotation;
   an impeller including an impeller shell having a first inner spherical surface including:
   a first frictional surface having
      a radius defining a first curvature; and
      the first spherical center;
      a turbine including a turbine shell having a second inner spherical surface including:
   a second frictional surface having
      the radius defining a second curvature; and
      the second spherical center;
      wherein the first and second frictional surfaces are arranged for frictional engagement.

2. The torque converter as in claim 1, wherein the impeller shell or turbine shell comprises friction material and wherein the first or second frictional surface is disposed on the friction material.

3. The torque converter as in claim 2, wherein the friction material includes a bonding surface and an opposite surface.

4. The torque converter as in claim 3, wherein the opposite surface is convex.

5. The torque converter as in claim 1, wherein the impeller shell comprises a first spherical portion including the first inner spherical surface, a rear cover outer surface, and a first thickness.

6. The torque converter as in claim 5, wherein the impeller shell further comprises first and second tapered portions and a second thickness greater than the first thickness.

7. The torque converter as in claim 5, wherein the impeller shell further comprises a cylindrical portion including an end portion and extending to and arranged for connection with a cover and a bent portion extending and integrally attached to an impeller shell torus portion.

8. The torque converter as in claim 1, wherein the turbine shell comprises a second spherical portion including the second inner spherical surface and an outer turbine shell surface.

9. The torque converter as in claim 8, wherein the turbine shell further comprises a radial wall portion extending and integrally attached to a turbine shell torus portion.

10. The torque converter as in claim 1, wherein the first spherical surface further comprises a circle including the radius and the first spherical center, wherein the first and second frictional surfaces are arranged for frictional engagement along the circle.

11. A torque converter comprising:
    an axis of rotation;
    first and second spherical centers positioned along the axis of rotation;
    a cover;
    an impeller including an impeller shell having:
       a first spherical portion including a first inner spherical surface including:
          a first frictional surface having
             a radius defining a first curvature; and
             the first spherical center;
       a bent portion; and
       a cylindrical portion including an end portion extending to and arranged for connection with the cover;
    a turbine including a turbine shell having:
       a second spherical portion including a second inner spherical surface including:
          a second frictional surface having
             the radius defining a second curvature; and
             the second spherical center;
    wherein the first and second frictional surfaces are arranged for frictional engagement;
    wherein the second spherical center is at the first spherical center when a clutch is engaged; and,
    wherein the second spherical center is offset from the first spherical center when the clutch is not engaged.

12. The torque converter as in claim 11, wherein the first spherical surface further comprises a circle including the radius and the first spherical center, wherein the first and second frictional surfaces are arranged for frictional engagement along the circle.

13. The torque converter as in claim 11, wherein the first or second spherical portion comprises friction material and wherein the first or second frictional surface is disposed on the friction material.

* * * * *